INVENTOR
Robert E. Wilson
BY
ATTORNEY

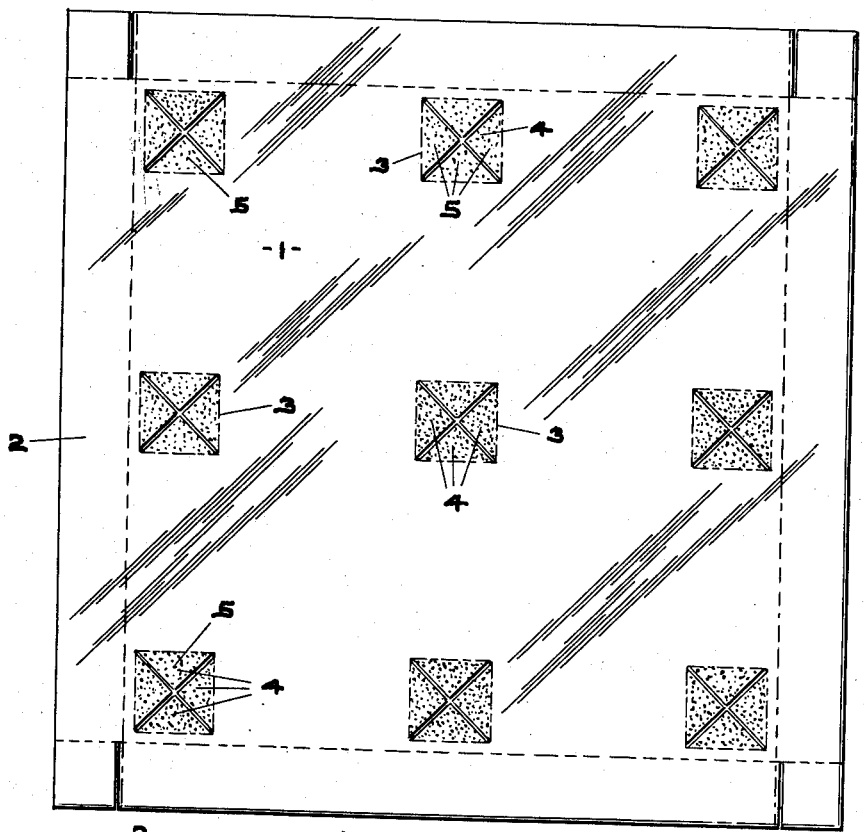
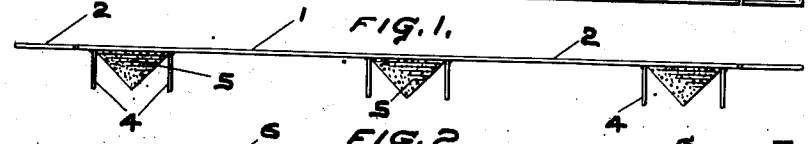
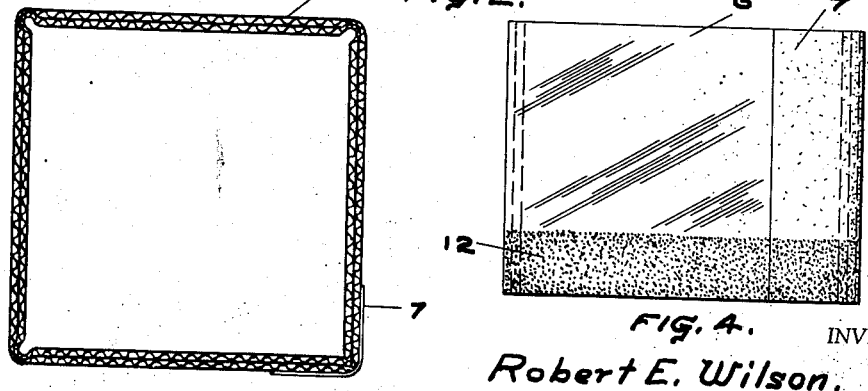
FIG. 1.
FIG. 2.
FIG. 3.
FIG. 4.
INVENTOR
Robert E. Wilson.
BY
ATTORNEY Sept. 25, 1962  R. E. WILSON  3,055,624
PALLET
Filed July 29, 1960  3 Sheets-Sheet 2

Sept. 25, 1962 R. E. WILSON 3,055,624
PALLET
Filed July 29, 1960 3 Sheets-Sheet 3

INVENTOR
Robert E. Wilson
BY
ATTORNEY

United States Patent Office 3,055,624
Patented Sept. 25, 1962

3,055,624
PALLET
Robert E. Wilson, Terre Haute, Ind., assignor to Hoerner Boxes, Inc., Keokuk, Iowa, a corporation of Delaware
Filed July 29, 1960, Ser. No. 46,229
7 Claims. (Cl. 248—120)

This invention relates to an inexpensive load bearing pallet.

The use of the load bearing pallet has become a very general method of handling materials in large quantities, with them a lift fork is used for moving the material from place to place, so that their main function is to support the load a sufficient distance from the floor to permit the tines of the fork to be inserted under them and the load. Although pallets have been used for some time, they were formerly a permanent type that had to be returned after shipment. In recent years they have been made of inexpensive materials such as corrugated board and paper board of different kinds so that they were so inexpensive that it is practical to discard them after a single use. They are also so light that their transportation cost is substantially negligible.

One of the objects of the invention is to produce a more rigid light weight pallet at still greater economy.

Another object of the invention is to construct the pallet so rigidly that it will sustain loads to which it is subjected and not fold or bend sidewise in movement or shipment.

Another object of the invention is to construct the pallet of paper board with its supporting members being so positioned as to impart increased rigidity. Another object is to render the supporting means impervious to moisture on the floor.

Another object of the invention is to produce a pallet that will guide the tines of the fork past the supports.

Other objects and advantages of the invention will be apparent from the following description and the accompanying drawings forming a part hereof and in which:

FIGURE 1 is an inverted plan view of the platform of the pallet.

FIGURE 2 is a side elevation view of the pallet of FIGURE 1 after being turned right side up.

FIGURE 3 is a top plan view of the outside of one of the supporting members.

FIGURE 4 is a side elevational view thereof.

In the drawings similar numerals refer to similar parts throughout the several views.

Figure 5:
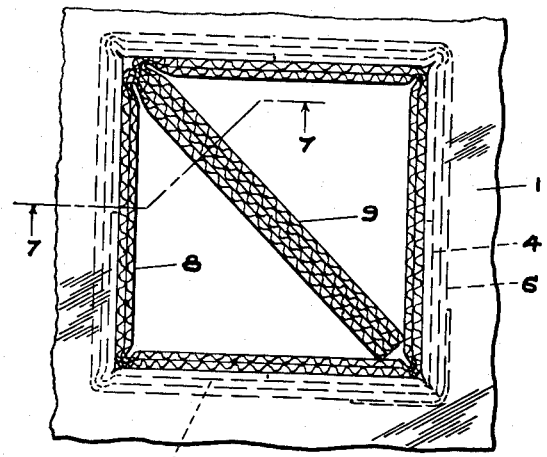
FIGURE 5 is a top plan view of the core of one of the supporting members in a fragmentary platform, showing in dotted lines the outer supporting member beneath the platform.
Figure 6:
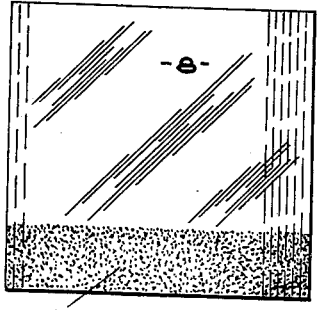
FIGURE 6 is a side elevational view of the core of FIGURE 5.
Figure 7:
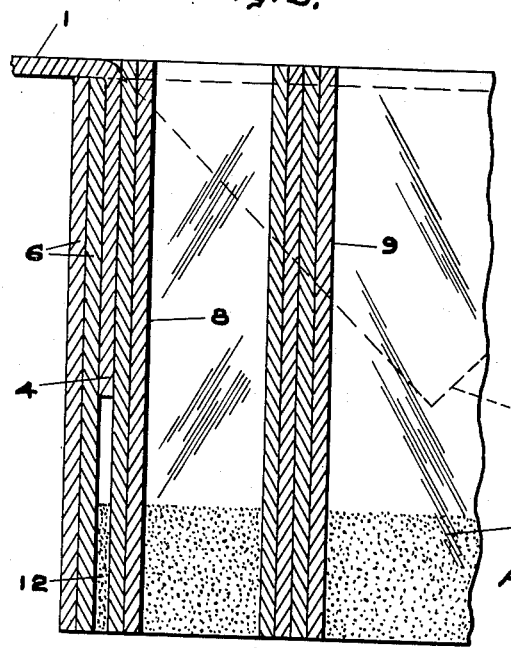
FIGURE 7 is a cross-sectional view on line 7—7 of FIGURE 5 on an enlarged scale.
Figure 8:
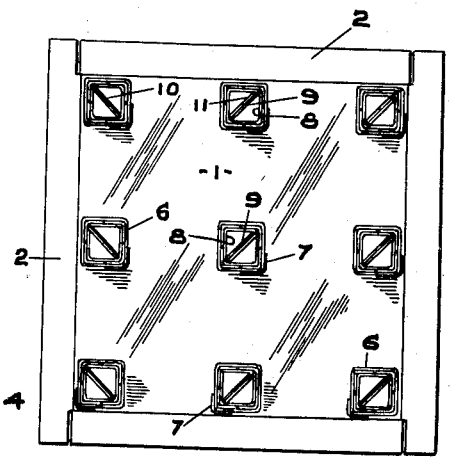
FIGURE 8 is an inverted plan view of the assembled pallet on a greatly reduced scale.
Figure 9:
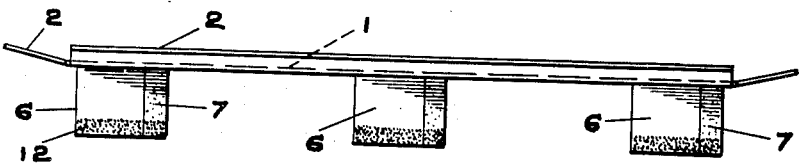
FIGURE 9 is a side elevational view of the assembled pallet in load supporting position.
Figure 10:
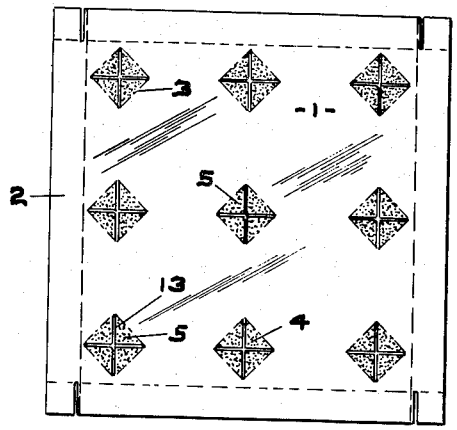
FIGURE 10 is an inverted plan view of a modification of the pallet platform.
Figure 11:
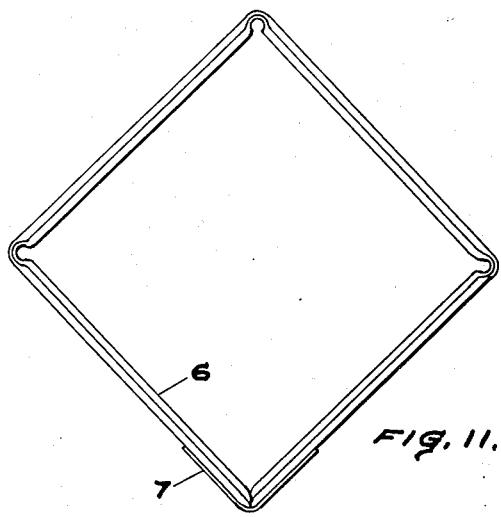
FIGURE 11 is a top plan view of the outer supporting member used in this modification on an enlarged scale.
Figure 14:
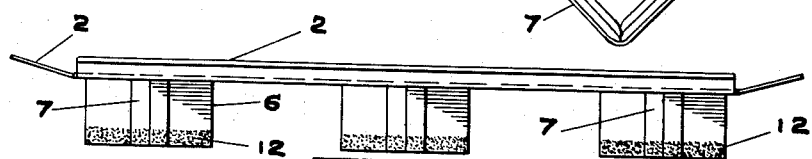
FIGURE 14 is a side elevational view of the pallet of this modification in load bearing position on a slightly larger scale.
Figure 13:
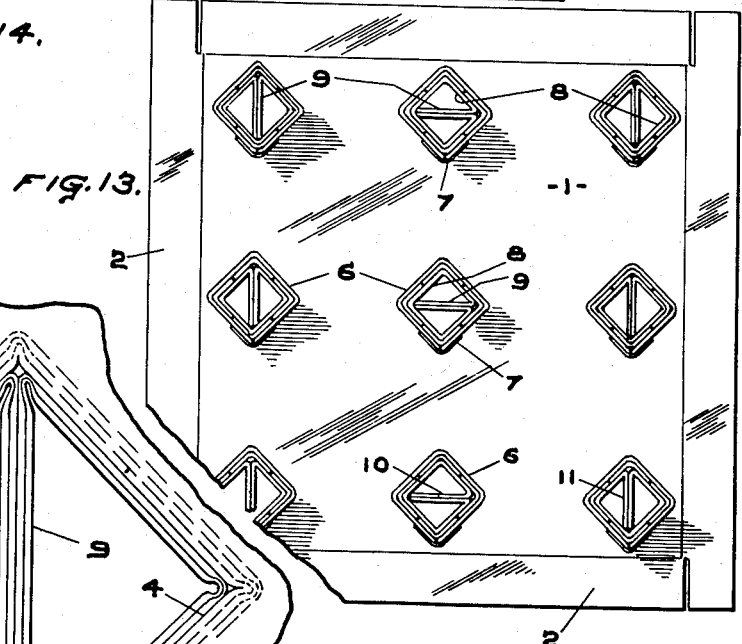
FIGURE 13 is an inverted plan view on a greatly reduced scale of the assembled pallet of this modification.
Figure 12:
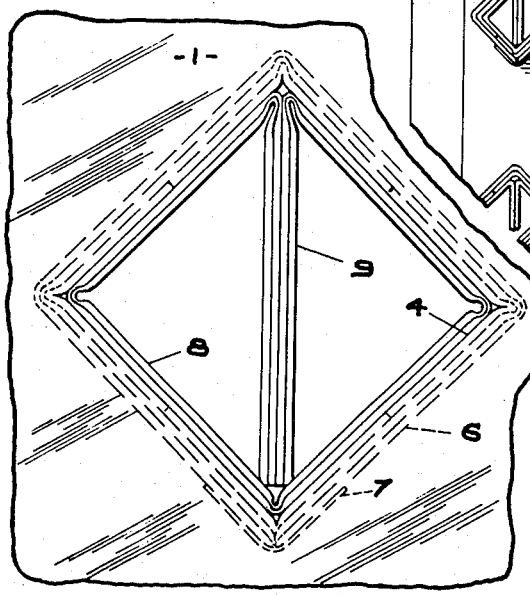
FIGURE 12 is a fragmentary top plan view of the pallet platform showing the core in place and the outer supporting member in dotted lines.

The load bearing platform 1 of double-faced corrugated board may have a scored margin 2 which, in the completed pallet, is turned slightly upward as shown in FIGURE 9. This margin may facilitate the entry of the fork tines under the pallet and load. It might also protect the load upon the pallet. The platform is initially scored with squares 3 and cut through with X shaped incisions forming prongs 4 as shown in FIGURE 1. These prongs also have adhesive 5 spread thereon. The pallet platform is then inverted. The load supporting members 6 are made of strips of double fluted corrugated board folded square and bound together at their ends by the adhesive strip 7. These members 6 are then arranged beneath the X cutouts from the platform and the prongs 4 are pushed down into the square supporting members 6. The cores 8 are likewise made of strips of double fluted corrugated board folded first into square formation and their ends 9 extend diagonally from corner to corner in the square as shown in FIGURE 5. This diagonal retains the cores from collapsing sidewise upon themselves, and holds them rigidly extended. The cores are then forced into the square openings in the platform left after the prongs 4 are pushed down into the supporting members 6 and adhesively affixed thereto. The cores extend to the bottom of the members 6, and are flush with the top of platform 1. The cores bear tightly against the prongs, as well as strengthening and more than doubling the bearing strength of the supporting members, as well as rendering them substantially rigid from collapse. As seen in FIGURE 8 the cores are placed within the supporting members so that the diagonals 9 of different cores extend in different directions as shown at 10 and 11 in this figure. This arrangement reinforces the pallet from collapsing sidewise. The bottom portions of both the cores 8 and the supporting members 6 are preferably coated with paraffin 12 to make them water resistant in use.

In the modification described above the supporting members are positioned with their sides parallel to the sides of the pallet platform. In the modification shown in FIGURES 10 to 14 the X incisions 13 initially cut through the platform have been placed parallel to the sides of the platform so that when they are bent downwardly they snugly fit the inside of supporting members 6 whose diagonals are parallel to the pallet platform sides. In this modification, the cores 8 likewise hold the prongs 4 firmly in adhesive holding position within the members 6, as well as increasing the strength of the supporting members as in the previously described modification. In this last modification also these cores are placed with certain of their diagonals in different directions than others to reinforce the supporting members from side-wise collapse in both directions. It will be apparent in this modification that since the tines of the lifting fork enter under the platform that, should they tend to strike the supporting members, they may be guided therefrom. Also in this modification, since the rectangular platform is formed with the corrugations parallel to two of the edges, that when the prongs are cut and folded downwardly, the board faces have a diagonal hold on the corrugations within the board of the platform which is more firm in retaining the supporting members on the platform by the adhesive than when they are folded with or at right angles to the formation of the flutes of the corrugated board.

It will be apparent that various modifications may be made in the detailed construction of the pallet above described without departing from the invention as defined in the claims.

What is claimed as new and is desired to be secured by Letters Patent is:

1. A load bearing pallet for use with a lift truck comprising a platform, a plurality of spaced continuous walled rectangular tubular supporting members normal thereto, said platform having prongs cut therein and folded downwardly into and adhesively secured to said members, a rectangular nesting core fitting tightly into said members against said prongs with walls parallel to all those of the members and prongs, and having an integral flap extending obliquely with respect to the walls of the core and members and between corners thereof, to brace the members against lateral collapse.

2. A load bearing pallet for use with a lift truck comprising a platform, a plurality of spaced continuous walled tubular members normal thereto, said members having walls angularly folded to present substantially opposite folds and said platform having prongs cut therein and folded downwardly into and adhesively secured to the inside of said members, and reinforcing cores having walls continuously parallel to those of the members and including integral with the cores strengthening means extending across their centers between substantially opposite folds fitted into said members and bearing against said prongs to retain them in member engagement and to reinforce the members against lateral collapse.

3. The pallet of claim 2 in which the tubular members are made of corrugated board with the corrugations normal to the platform.

4. A load bearing pallet for use with a lift truck comprising a platform and a plurality of spaced continuous walled tubular supporting members normal thereto and formed from hingedly connected side wall sections, the platform having integral prongs cut therein and folded from the plane thereof into said members, parallel to the side wall sections thereof and adhesively secured thereto, leaving corresponding openings in the platform, a core tightly fitting into each said opening having side walls parallel to all the depending prongs and reinforcing the respective supporting members, the core including integral means extending centrally thereof and between adjacent pairs of side wall sections to brace them from folding.

5. The pallet of claim 4 in which the tubular member is rectangular and the core is a rectangularly folded strip in which a strip end extends from a corner of the rectangle diagonally to the opposite corner to brace the supporting member upon insertion of the core thereinto.

6. The pallet of claim 4 in which the tubular member is rectangular and the core is a rectangularly folded strip in which both strip ends extend from a corner of the rectangle diagonally to the opposite corner to brace the supporting member upon insertion of the core thereinto.

7. The pallet of claim 4 in which the platform is rectangular and is made of corrugated board and the members are substantially square and the means extending centrally of the cores are diagonals to the square cores and members and are respectively substantially parallel and normal to the sides of the platform.

References Cited in the file of this patent

UNITED STATES PATENTS

| | | |
|---|---|---|
| 2,503,240 | Cahners | Apr. 11, 1950 |
| 2,914,282 | Budd | Nov. 24, 1959 |

FOREIGN PATENTS

| | | |
|---|---|---|
| 779,014 | Great Britain | July 17, 1957 |